United States Patent
Lee et al.

(10) Patent No.: US 9,479,393 B2
(45) Date of Patent: Oct. 25, 2016

(54) RELAY CONFIGURATION SYSTEMS AND METHODS

(71) Applicant: Schweitzer Engineering Laboratories, Inc., Pullman, WA (US)

(72) Inventors: Tony J. Lee, Pullman, WA (US); Stephen L. Dodgen, Pullman, WA (US); Michael H. Patrick, Seattle, WA (US); Lee S. Underwood, Charlotte, NC (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 215 days.

(21) Appl. No.: 14/450,511

(22) Filed: Aug. 4, 2014

(65) Prior Publication Data

US 2016/0036633 A1 Feb. 4, 2016

(51) Int. Cl.
*G06F 15/177* (2006.01)
*H04L 12/24* (2006.01)

(52) U.S. Cl.
CPC ......... *H04L 41/0803* (2013.01); *H04L 41/082* (2013.01); *H04L 41/085* (2013.01); *H04L 41/0843* (2013.01); *Y04S 40/162* (2013.01)

(58) Field of Classification Search
CPC . H04L 41/0803; H04L 41/08; H04L 41/085; H04L 41/082; H04L 41/0843
See application file for complete search history.

(56) References Cited

U.S. PATENT DOCUMENTS

| | | | |
|---|---|---|---|
| 5,963,734 A | 10/1999 | Ackerman | |
| 6,279,035 B1 | 8/2001 | Brown | |
| 6,496,927 B1 | 12/2002 | McGrane | |
| 6,618,736 B1 | 9/2003 | Menage | |
| 6,745,254 B2 | 6/2004 | Boggs | |
| 6,813,571 B2 | 11/2004 | Lightbody | |
| 6,885,974 B2 | 4/2005 | Holle | |
| 7,085,824 B2 | 8/2006 | Forth et al. | |
| 7,127,328 B2 | 10/2006 | Ransom | |
| 7,383,327 B1 | 6/2008 | Tormasov | |

(Continued)

FOREIGN PATENT DOCUMENTS

| | | |
|---|---|---|
| EP | 1087294 | 3/2001 |
| WO | 0073866 | 12/2000 |
| WO | 2010120048 | 12/2010 |

OTHER PUBLICATIONS

PCT/US2015/042610 Patent Cooperation Treaty, International Search Report and Written Opinion of the International Searching Authority, Oct. 23, 2015.

(Continued)

*Primary Examiner* — Krisna Lim
(74) *Attorney, Agent, or Firm* — Jared L. Cherry

(57) ABSTRACT

Disclosed herein are a variety of systems and methods that may be utilized to facilitate the configuration of intelligent electronic devices (IED) and other devices. In one embodiment, a configurable IED may be able to perform a plurality of features. The plurality of features may be enabled by a plurality of functional modules configured to implement the plurality of features. A feature-selecting subsystem configured to receive a first feature-selecting filter and to apply the first feature-selecting filter to selectively enable a subset of a plurality of features based on the feature-selecting filter. The subset of the plurality of features may be associated with a plurality of feature configuration settings. A feature configuration subsystem configured to receive at least one configuration filter and to set at least a subset of the plurality of feature configuration settings.

34 Claims, 7 Drawing Sheets

(56) References Cited

U.S. PATENT DOCUMENTS

| | | |
|---|---|---|
| 7,447,760 B2 | 11/2008 | Forth |
| 7,788,731 B2 | 8/2010 | Morris |
| 8,165,841 B2 * | 4/2012 | Vetter ................... H04L 43/028 |
| | | 702/122 |
| 8,554,739 B2 | 10/2013 | Lee |
| 2002/0049841 A1 | 4/2002 | Johnson |
| 2002/0108059 A1 | 8/2002 | Canion |
| 2002/0152305 A1 | 10/2002 | Jackson |
| 2002/0165677 A1 | 11/2002 | Lightbody |
| 2004/0003321 A1 | 1/2004 | Glew |
| 2004/0138786 A1 | 7/2004 | Blackett |
| 2005/0030693 A1 | 2/2005 | Deak |
| 2005/0071106 A1 | 3/2005 | Huber |
| 2005/0097373 A1 | 5/2005 | Stoupis |
| 2006/0056370 A1 | 3/2006 | Hancock |
| 2006/0116794 A1 | 6/2006 | Stoupis |
| 2006/0230394 A1 | 10/2006 | Forth |
| 2008/0034019 A1 | 2/2008 | Cisler |
| 2008/0234872 A1 * | 9/2008 | Vetter ................. G06F 17/2247 |
| | | 700/286 |
| 2008/0234957 A1 | 9/2008 | Banhegyesi |
| 2008/0235355 A1 | 9/2008 | Spanier |
| 2008/0312851 A1 | 12/2008 | Kagan |
| 2010/0020724 A1 | 1/2010 | Wimmer |
| 2010/0054276 A1 | 3/2010 | Wang |
| 2010/0205418 A1 * | 8/2010 | Kishan .................... G06F 17/50 |
| | | 713/1 |
| 2011/0069709 A1 * | 3/2011 | Morris .................. H04L 47/527 |
| | | 370/394 |
| 2011/0069718 A1 * | 3/2011 | Morris ............. H04L 12/40143 |
| | | 370/419 |
| 2011/0282507 A1 * | 11/2011 | Oudalov .................. H04B 3/54 |
| | | 700/292 |
| 2012/0185436 A1 | 7/2012 | Lee |
| 2012/0191959 A1 | 7/2012 | Kumar |
| 2012/0303299 A1 | 11/2012 | Banhegyesi |
| 2014/0277801 A1 * | 9/2014 | Cioraca .................... G05F 1/70 |
| | | 700/292 |

OTHER PUBLICATIONS

PCT/US2012/020793 Patent Cooperation Treaty, International Search Report and Written Opinion of the International Searching Authority, Mar. 26, 2012.

Bringing Security to Utility Industry Using Novel Intrusion Detection & Prevention System: ADEG-G, Copyright Jan. 2013, Applied Communication Sciences.

ChenWei Yang et al., "Programmable Logic for IEC 61850 Logical Nodes by means of IEC 61499", IEEE 37th International Conference of Industrial Electronics Society (IECON"11) Nov. 7-10, 2011, pp. 1-7.

Acselerator Quickset SEL-5030 Software Instruction Manual, Schweitzer Engineering Laboratories, Jul. 8, 2014.

PCT/US2006/011284 Patent Cooperation Treaty, International Search Report and Written Opinion of the International Searching Authority, Dec. 26, 2007.

Canadian Office Action dated May 22, 2008 to Ridout & Maybee LLP for Application No. 6,600,471; Owner: Schweitzer Engineering Laboratories, Inc.; Date: Mar. 10, 2009; by Authorized Officer: Nora Linder.

* cited by examiner

RELAY CONFIGURATION SYSTEMS AND METHODS

RELATED APPLICATIONS

None

TECHNICAL FIELD

This disclosure relates to techniques that may be utilized to facilitate the configuration of intelligent electronic devices using a feature-selecting filter and/or a configuration filter. The feature-selecting filter and/or a configuration filter may be used in various embodiments to configure a device to perform a specific task and/or to enable or disable functionality of the device.

BRIEF DESCRIPTION OF THE DRAWINGS

Non-limiting and non-exhaustive embodiments of the disclosure are described, including various embodiments of the disclosure with reference to the figures, in which.

Figure 1:
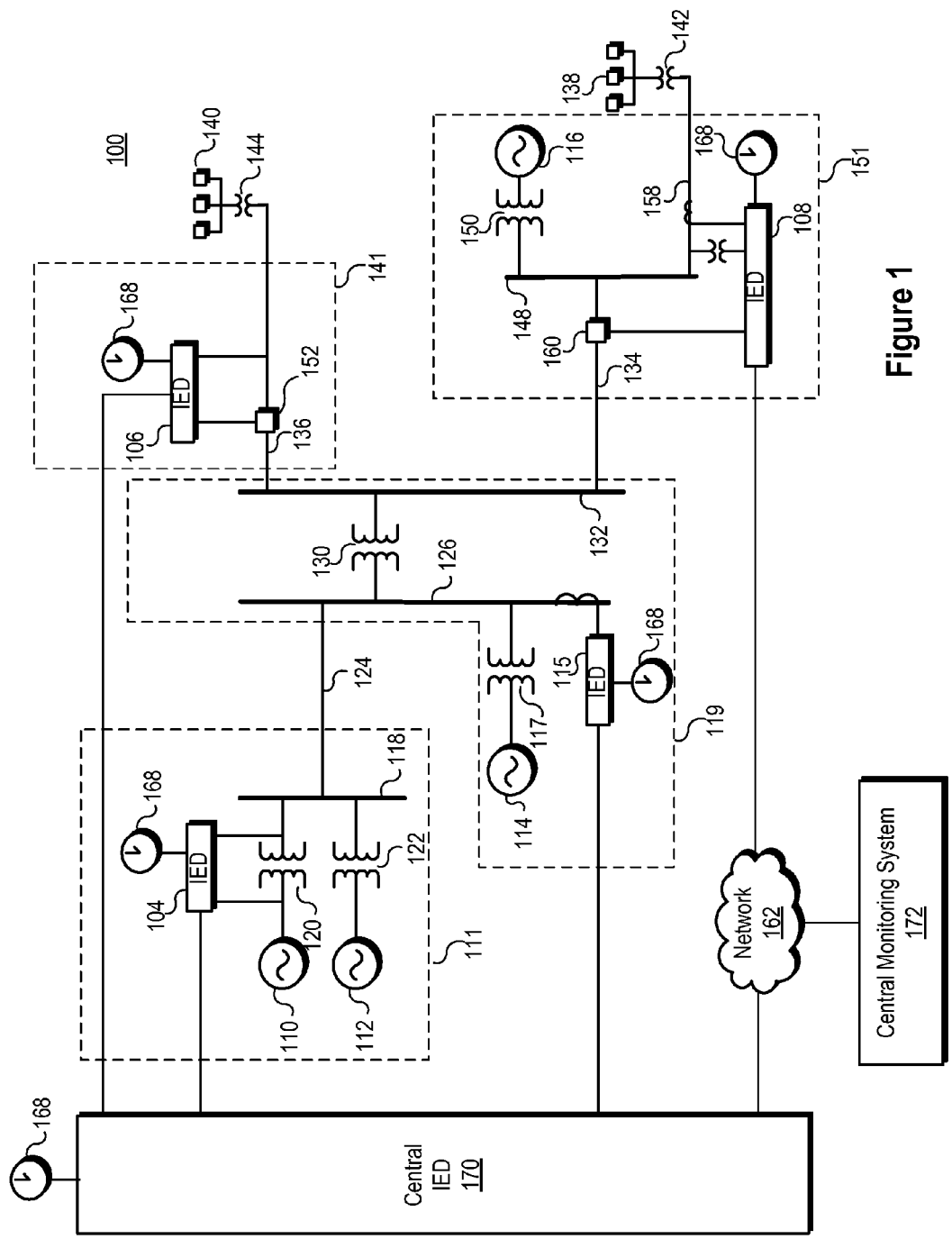
FIG. 1 illustrates an example of an embodiment of a simplified one-line diagram of an electric power delivery system with various substations consistent with embodiments of the present disclosure.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Modern automation, electric power transmission, and distribution systems typically include intelligent electronic devices ("IEDs") for protection, control, automation, and/or monitoring of equipment in the system. IEDs may be used to monitor equipment of many types, including electric transmission lines, electric distribution lines, current transformers, buses, switches, circuit breakers, reclosers, transformers, autotransformers, tap changers, voltage regulators, capacitor banks, generators, motors, pumps, compressors, valves, and a variety of other types of monitored equipment. In view of the wide variety of configurations in which an IED may be used and the wide variety of tasks that an IED may be configured to perform, many IEDs may include a large number of user-configurable settings. While the wide array of user-configurable settings may allow for considerable flexibility in the use of an IED, the large number of user-configurable settings may also complicate the task of configuring an IED. For example, a user who is unfamiliar with a particular function of each of the user-configurable settings may incorrectly configure an IED for its intended purpose. This incorrect configuration may result in undesired operation and/or unnecessary expense associated with identifying a problem and correcting the configuration.

Disclosed herein are a variety of systems and methods that may be utilized to facilitate the configuration of IEDs using feature-selecting filters and configuration filters. Feature-selecting filters and configuration filters may facilitate the task of configuring a device to perform a particular task in a variety of ways, including: specifying device settings, selectively making available to the user only particular settings that might need to be modified for a specific application of the IED; enabling or disabling features of the device, etc. Use of feature-selecting filters and device configuration filters, as disclosed herein, may simplify the task of configuring complex devices in a variety of contexts, including IEDs, network equipment, computer terminals, etc.

In various embodiments, feature-selecting filters and configuration filters may be created at a variety of levels ranging from generic to specific. The filters may be generated using a configuration tool that may facilitate the configuration of one device or a plurality of devices. In some embodiments the configuration tool may permit various levels of abstraction to allow a plurality of users to operate within their respective spheres of responsibility and to use feature-selecting filters and configuration filters that are created and applied consistent with the teachings of the present disclosure. For example, at a system level, certain settings may be specified by a system designer (e.g., settings, ranges, and rules associated with various components in the system). At a lower level of abstraction other settings may be specified with a greater level of granularity, but the design choices made at the higher level may impose constraints on choices made at a lower level.

For example, a system designer may create a system architecture that is implemented using a plurality of devices. A configuration tool may translate the design choices into a plurality of device configuration files that may facilitate the implementation of the system based on the settings, ranges, and rules created by the designer. Another user, at a lower level of abstraction may specify specific values of a particular installation consistent with the parameters set by the system designer. At still a lower level of abstraction, the parameters from the system level and the particular installation level may be translated into actual settings implemented within specific devices configured to perform a specific task.

In certain embodiments, the techniques disclosed in the present application may be applied to a product line. Individual products may be defined as a subset of available features and/or functions that can be performed by the product. In this way, product variation may be limited and controlled by selectively enabling and disabling function blocks, rather than the development of product-specific features. Functional blocks may be designed and modified independently, which may allow for more efficient development and support of the product line.

Reference throughout this specification to "one embodiment" or "an embodiment" indicates that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and/or a product of a process.

The phrases "connected to," "networked," and "in communication with" refer to any form of interaction between two or more entities, including mechanical, electrical, magnetic, and electromagnetic interaction. Two components may be connected to each other, even though they are not in direct physical contact with each other and even though there may be intermediary devices between the two components.

Some of the infrastructure that can be used with embodiments disclosed herein are already available, such as: general-purpose computers, computer programming tools and techniques, digital storage media, and optical networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as: non-volatile memory, static RAM, dynamic RAM, ROM, CD-ROM, disk, tape, magnetic, optical, flash memory, or other computer readable storage medium.

The described features, operations, or characteristics may be combined in any suitable manner in one or more embodiments. It will also be readily understood that the order of the steps or actions of the methods described in connection with the embodiments disclosed herein may be changed, as would be apparent to those skilled in the art. Thus, any order in the drawings or detailed description is for illustrative purposes only and is not meant to imply a required order, unless specified to require an order.

In the following description, numerous details are provided to give a thorough understanding of various embodiments. One skilled in the relevant art will recognize, however, that the embodiments disclosed herein can be practiced without one or more of the specific details, or with other methods, components, materials, etc. In other instances, well-known structures, materials, or operations are not shown or described in detail to avoid obscuring aspects of this disclosure.

FIG. 1 illustrates an example of an embodiment of a simplified one-line diagram of an electric power delivery system 100 with various substations consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 144 and 150), power transmission and delivery lines (e.g., lines 124, 134, and 158), circuit breakers (e.g., breakers 152 and 160), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 may be used to step down a voltage for consumption by load 140.

Distribution line 134 may also lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. According to various embodiments, central monitoring system 172 may comprise one or more of a variety of types of systems. For example, central monitoring system 172 may include a supervisory control and data acquisition (SCADA) system and/or a wide area control and situational awareness (WACSA) system.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

The electric power delivery system 100 illustrated in FIG. 1 may include a generation substation 111. Substation 111 may include various generators 110 and 112 connected to a bus 118 through step-up transformers 120 and 122. Bus 118 may be connected to bus 126 in substation 119 via transmission line 124. Although the equipment in substation 111 may be monitored and/or controlled by various IEDs, only a single IED 104 is shown. IED 104 may be a transformer protection IED for transformer 120.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, 170 may receive a common time signal 168. The time signal may be distributed in system 100 using a communications network 162 or using a universal time source, such as a GNSS, or the like.

In various embodiments, feature-selecting filters and configuration filters may be created and used to configure one or more of IEDs 104, 106, 108, 115, and 170. The filters may, for example, specify a plurality of settings, ranges, and rules created by a designer of system 100. The filters may further be configured to implement actual settings within specific devices configured to perform a specific task. For example, a specific combination of feature-selecting filters and device configuration filters may configure IED 104 to monitor the operation generator 110, while another specific combination of feature-selecting filters and device configuration filters may configure IED 106 to monitor distribution line 136 and control breaker 152. In various embodiments, specific filters may be created using a configuration tool (not shown).

Figure 2:
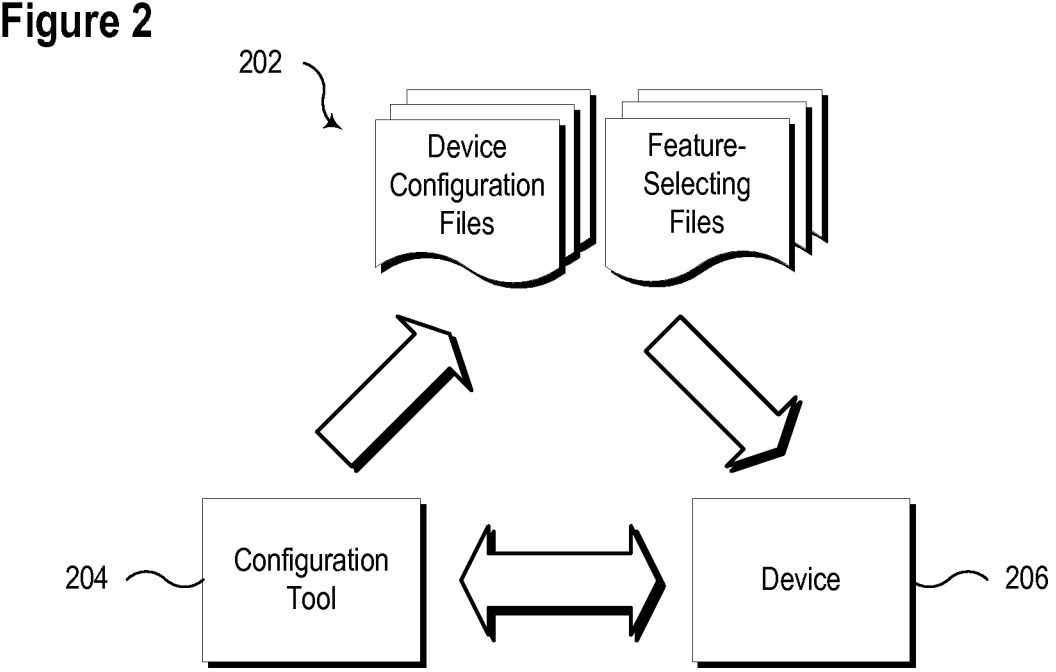
FIG. 2 illustrates a conceptual representation of a configuration tool configured to generate a plurality of device configuration files and a plurality of feature-selecting files that may be used to configure a device consistent with embodiments of the present disclosure.

FIG. 2 illustrates a conceptual representation of a configuration tool 204 configured to generate feature-selecting filters and configuration filters 202 that may be used to configure a device 206 consistent with embodiments of the present disclosure. In various embodiments, the configuration tool 204 may be embodied as a computer system and a configuration program. The configuration tool may be a stand-alone program or may be integrated into any of a variety of computer-aided engineering (CAE) programs. The configuration tool 204 may be configured to produce feature-selecting filters and device configuration filters 202 in a variety of formats, including but not limited to: an XML file, a plain text file, an encrypted file, or a file in any number of other suitable formats. Certain embodiments may utilize XML because the file format may allow for the file to be human-readable and machine-readable.

The device 206 may be configured to receive the device configuration filters and feature-selecting filter 202 and map the settings or parameters from the feature-selecting filters and configuration filters 202 to the settings of the device 206. In various embodiments, the device 206 may comprise a wide range of configurable devices. In certain embodiments, such devices may be used in connection with an electric power distribution system, and may include relays configured to monitor and protect equipment in the power system, including a differential relay, a distance relay, a directional relay, a feeder relay, an overcurrent relay, a voltage regulator control, voltage relays, a breaker failure relay, a generator relay, a motor relay, and the like.

In some embodiments, firmware associated with device 206 may accept the feature-selecting filters and configuration filters 202 and may implement the names, ranges, prompts, and rules for settings associated with device 206. In some embodiments, the feature-selecting filters and/or configuration filters may comprise a simplified set of configuration settings that are directed toward identifying a particular function to be performed and that map to device settings ("EZ settings"). In embodiments including EZ settings, the settings interfaces may exist as a layer on top of the device settings and simplify the user's interaction with the configuration settings. In some embodiments, a user may be able to utilize EZ settings or the full complement of device settings. Further, in some embodiments, the feature-selecting filters and device configuration filters 202 may further be configured to selectively enable or disable the visibility of a particular setting.

Figure 3:
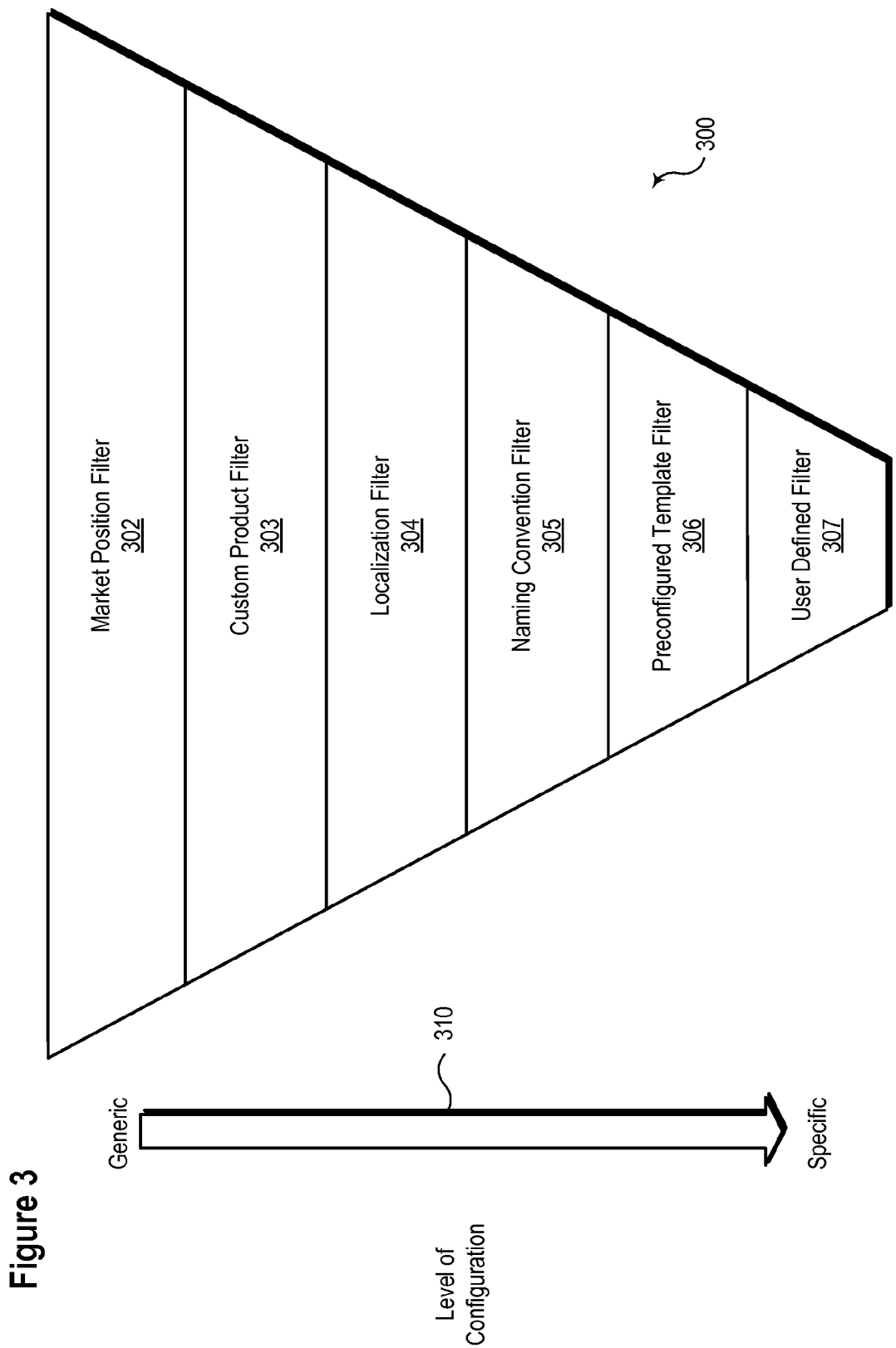
FIG. 3 illustrates a conceptual representation of a plurality of filters ranging from generic to specific that may be used for configuration of devices consistent with embodiments of the present disclosure.

FIG. 3 illustrates a conceptual representation 300 of a plurality of filters 302-307 ranging from generic to specific that may be used in connection with use of feature-selecting filters and device configuration filters used for configuration of devices consistent with embodiments of the present disclosure. Arrow 310 may indicate the level of specificity associated with a particular filter. In various embodiments a schema may be implemented for creating a device configuration file based on the plurality of filters 302-307. Each of the plurality of filters 302-307 may be utilized to simplify the task of configuring a device (not shown) to perform a specific task. The plurality of filters 302-307 illustrated in FIG. 3 are provided as only one possible embodiment consistent with the present disclosure. Other embodiments are not constrained to any particular arrangement, hierarchy, or structure. Further, the features described herein as pertaining to one specific filter in connection with the specific embodiment illustrated in FIG. 3, may be associated with another filter, or a different number of filters may be used in other embodiments.

The market position filter 302 may define the basic function of a configurable device. As the triangular shape of the conceptual representation 300 may suggest, the maximum capability of a device may be defined at the highest level (i.e., the broadest section of the triangle). For example, where the device is a relay used in an electric power distribution system, the market position filter 302 may differentiate a transformer differential relay from a motor relay. Although both types of relays may provide automation and/or protection element functions, the settings associated with the different tasks may differ. Accordingly, the plurality of filters 302-307 may selectively make available applicable settings and/or hide inapplicable settings. Further, in the case of transformer differential relay, a number of differential zones may be specified. In other specific examples, additional high-level features may also be specified by the market position filter 302.

In some embodiments, the hardware requirements of a product may be specified based on the one or more of the plurality of filters 302-307. For example, a specific hardware configuration may be associated with a plurality of types of devices for a plurality of market position filters. As the level of configuration increases along arrow 310, the filters may become less tied to hardware constraints (e.g., processor burden, etc.), and directed more toward configuration.

A custom product filter 303 may permit variation within a product line (e.g., a variation of an existing product to satisfy a customer request). A manufacturer may desire to vary its product line to meet its customer's requests, but may not want to manage an unwieldy product line or provide training to its employees on a large number of related products. Use of a custom product filter 303 may permit specific requests to be implemented without other drawbacks that may otherwise make a particular product line more difficult to manage. In one specific example, the product may be a distribution relay for use in an electric power distribution system. The relay may typically include two phase 51 elements and a power element, but a third element may be desired by some customers. To accommodate the request, a custom product filter 303 may be used to configure the relay with three phase 51 elements.

A localization filter 304 may provide configuration of a device relating to visible attributes of settings, such as prompts, warning messages, and the like. The localization filter 304 may, in addition to other benefits, facilitate uniformity in a system by configuring devices to provide consistent visual displays.

A naming convention filter 305 may use the naming conventions provided in IEC 61850 7-4 for protection logical node settings in some embodiments. In other embodiments, the settings defined by the IEC 61850 7-4 may not have a one-to-one correlation with device settings. Accordingly, certain settings may be hidden or exposed, as appropriate, to implement desired functionality. Where a feature set extends beyond the naming conventions provided in IEC 61850 7-4, additional settings may be available through logical node extensions or in other ways (e.g., through rules defined in the Device Configuration Language file).

A preconfigured template filter 306 may permit a reduction in complexity of the configuration settings number or configuration options that are presented to a user. In one embodiment, the preconfigured template filter 306 may comprise a plurality of quickset options that may be used to configure a device to perform a specific function.

A user-defined template filter 307 may permit users to develop and modify custom templates. In some embodiments, the user defined filters may exist at the same level as the preconfigured template filter 306, while in other embodiments, the user defined template may be constrained by the preconfigured template filter 306 or other filters.

Figure 4:
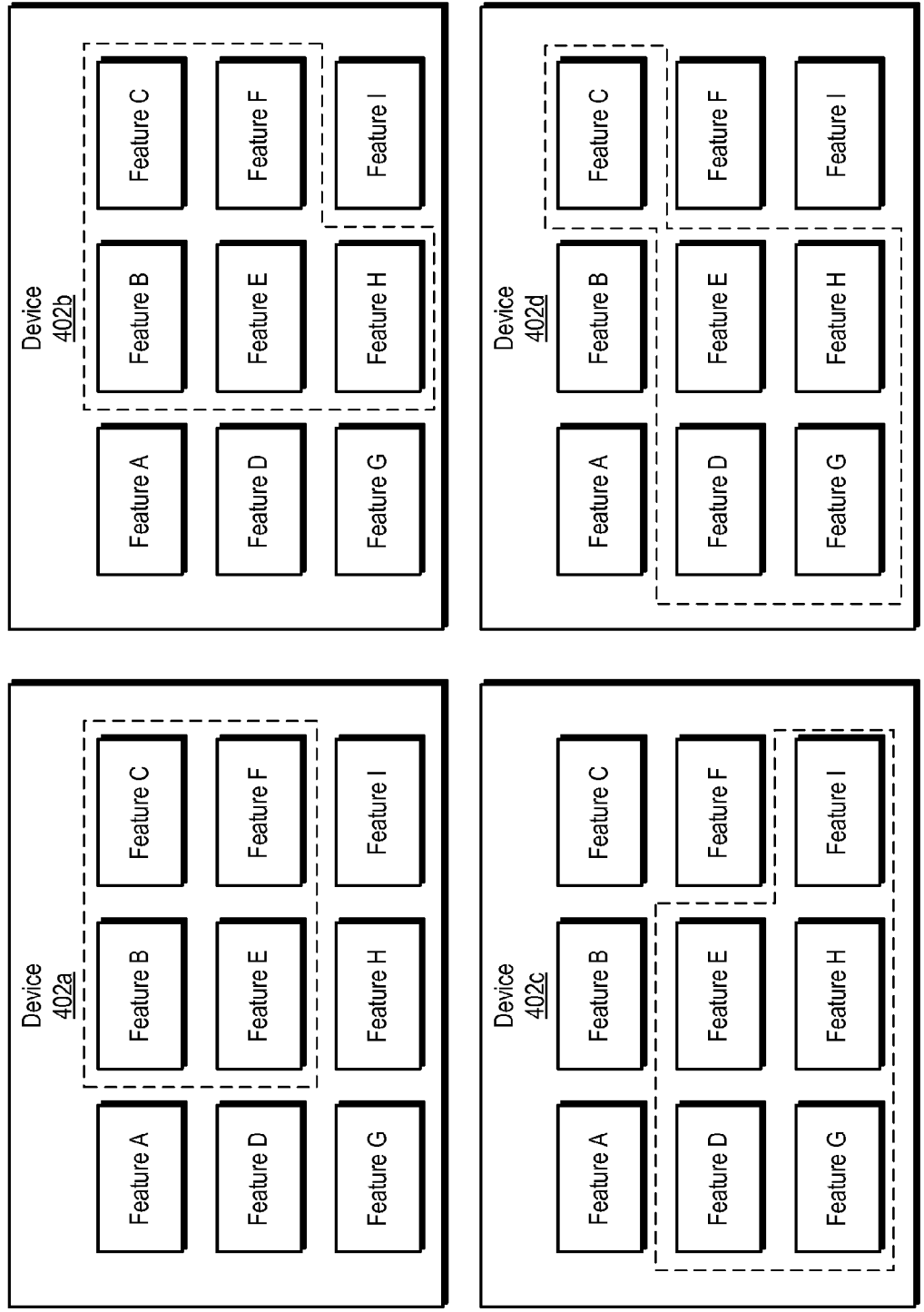
FIG. 4 illustrates a conceptual representation of a plurality of configurations of a device in which a specific subset of features of the device are enabled and configured consistent with embodiments of the present disclosure.

FIG. 4 illustrates a conceptual representation of a plurality of configurations of a device 402a-402d in which a specific subset of features of the device are enabled based on feature-selecting filters and device configuration filters consistent with embodiments of the present disclosure. In the illustrated embodiment, each device 402a-402d includes a set of features A-I; however, the specific features enabled for each device vary. In some embodiments, different feature sets may be selected based on which version of a product is purchased.

In some embodiments, a user may later be permitted to upgrade to an enhanced set of features without the need to actually replace a device. Rather, certain embodiments may allow for the configuration of a device in the field using, for example, a license server, a USB dongle, or other form of data transfer in which appropriate configuration settings may be transferred to the device. Such embodiments may advantageously allow for devices to be upgraded and reconfigured in place and may thus reduce downtime and expense associated with the upgrade. In such embodiments, a user may be prevented from enabling upgradable features, even though additional features may be present in the system, unless the user upgrades. For example, a user may have originally purchased the configuration of device 402a, but later may want to upgrade to the configuration of device 402b (i.e., by adding feature H). A vendor of device 402b may be able to enable feature H through the use of the configuration techniques consistent with the present disclosure, thus resulting in device 402a having the configuration of device 402b. The ability to perform such upgrades without the need to remove existing hardware and replace the hardware with the upgraded equipment may be of particular value where such a change could disrupt operation of a system (e.g., an electrical power distribution system, a communications network, etc.).

In contrast to the example described above, in which a user may need to upgrade to access additional features, in other embodiments users may be permitted to enable different features. For example, in one embodiment, a user may be permitted to select a certain number of features of a product that are active at a given time. In such an embodiment, a user may elect the feature set illustrated in device 402c (e.g., a feature set including 5 features), but later may desire to utilize the set of features illustrated in device 402d (e.g., a feature set also including 5 features, but replacing Feature I with Feature C).

In still another example, various feature sets may be enabled or disabled depending upon a specific scenario in which a device is to be used. Features that may be present in the device but not needed for the specific application may be disabled to facilitate configuration of the device or for other reasons (e.g., improving the functioning of the device by utilizing device resources only for active features). In one specific embodiment, a user may be prompted to answer a series of questions relating to how the device will be used. Based on the user's response to the questions, features may be enabled or disabled as appropriate to implement operation of the device consistent with the user's responses to the questions. As may be appreciated, a variety of other possibilities are also contemplated for selectively enabling and disabling various features.

In still other embodiments, one or more of the features A-I may include a plurality of sub-features, each of which may be independently enabled or disabled. Such embodiments may further increase the number of configurations permitted for a particular device or group of devices.

Figure 5:
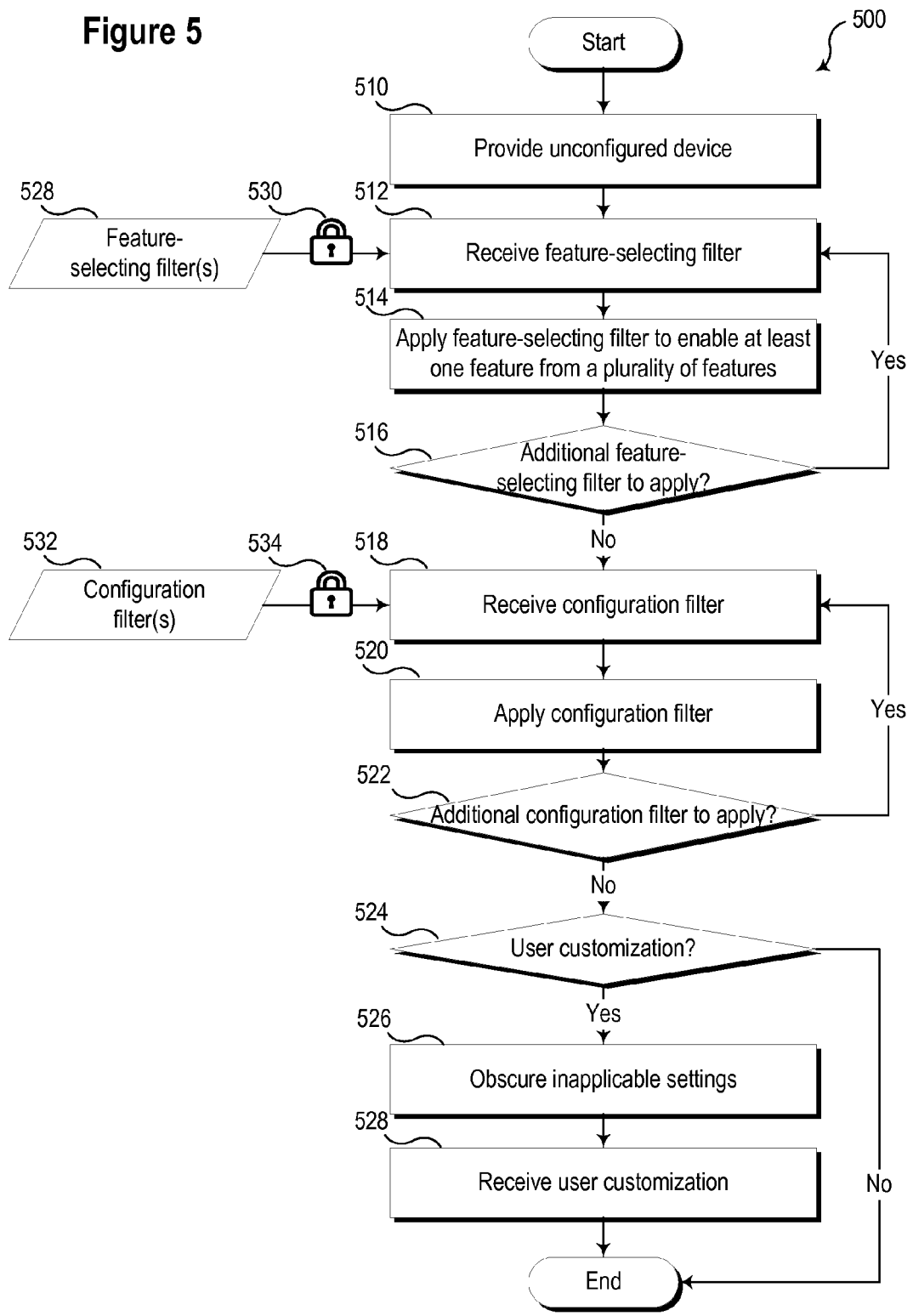
FIG. 5 illustrates a flow chart of a method for configuring a device using a feature-selecting filter and a configuration filter consistent with embodiments of the present disclosure.

FIG. 5 illustrates a flow chart of a method 500 for configuring a device using one or more feature-selecting filters and one or more configuration filters consistent with embodiments of the present disclosure. In the illustrated embodiment, a configurable device 510 may be provided. The configurable device may include a plurality of features that are configured to be selectively enabled based on one or more feature-selecting filters 528 and one or more configuration filters 532.

At 512, a feature-selecting filter 528 may be received. The transfer of the feature-selecting filter 528 may be performed securely, as indicated by lock 530. A variety of mechanisms and techniques for secure transmission of the feature-selecting filter(s) are contemplated, including use of encryption and other mechanisms for secure data transmission. In some embodiments, a remote server may be used to verify the feature-selecting filter(s) recited at 512. In some embodiments, the feature-selecting filter 528 may comprise one or more of a market position filter, a custom product filter, or a localization filter, as have been described in connection with FIG. 3.

Returning to a discussion of FIG. 5, at 514, the feature-selecting filter 528 may be applied to the device. In some embodiments, the device may be configured to receive the feature-selecting filter(s) 528 and to selectively enable a subset of the total feature set associated with the device. Of course, depending on the specific feature-selecting filter(s), an entire feature set of a particular device may be enabled. In addition to enabling certain features based on the feature-selecting filter(s) 528, other features may be disabled or obscured. For example, a device may include hardware that is to be selectively enabled only if a user purchases an upgrade. As discussed above, the ability to upgrade a device, rather than removing the device and inserting another device in its place, may reduce or eliminate downtime associated with such an upgrade.

Implementing the feature-selecting filter(s) at the firmware-level of the device may implement the appropriate selection of features in a relatively permanent manner and may help to prevent users from altering the feature set enabled by the feature-selecting filter(s) 528. In some embodiments, the firmware-level implementation may utilize techniques, such as flashing a non-volatile memory device, to implement the selection of the features identified by feature-selecting filter(s) 528. In other embodiments, implementation of the feature-selecting filter 514 at the application level of a device is also contemplated.

At 516, method 500 may determine whether any additional feature-selecting filters remain to be applied. In various embodiments, multiple feature-selecting filters 528 may be applied. As discussed in connection with FIG. 3, a plurality of filters may be applied that range from generic to specific. For example, a system designer may create a system architecture that is implemented using a plurality of devices. A configuration tool may translate the design choices into a plurality of device configuration files that may facilitate the implementation of the system based on the settings, ranges, and rules created by the designer. Another user, at a lower level of abstraction may specify specific values of a particular installation consistent with the parameters set by the system designer. At still a lower level of abstraction, the parameters from the system level and the particular installation level may be translated into actual settings implemented within specific devices configured to perform a specific task.

Returning to a discussion of FIG. 5, at 518, one or more configuration filters 532 may be received. The transfer of the configuration filter(s) 532 may be performed securely, as indicated by lock 534. As described above, a variety of mechanisms and techniques for secure transmission of the configuration filter 532 are contemplated. In some embodiments, the configuration filter(s) 532 may comprise one or more of a naming convention filter, a preconfigured template filter, and a user defined filter, as have been described in connection with FIG. 3.

Returning to a discussion of FIG. 5, at 520, the configuration filter(s) 532 may be applied. In various embodiments, the configuration filter(s) 532 may be configured to implement a plurality of settings associated with the device to cause the device to perform a specific task. As discussed above, one specific application of method 500 may relate to an IED used in an electric power distribution system. In view of the wide variety of configurations in which an IED may be used and the wide variety of tasks that an IED may be configured to perform, many IEDs may include a large number of user-configurable settings. While the wide array of user-configurable settings may allow for considerable flexibility in the use of an IED, the large number of user-configurable settings may also complicate the task of configuring an IED. Incorrect configuration may result in undesired operation and/or unnecessary expense associated with identifying the problem and correcting the configuration.

Use of configuration filter(s) 532 may provide settings to a device and/or may selectively display or hide settings to facilitate configuration of a device. In one embodiment, the configuration filter(s) 532 may comprise a series of questions that may be answered by a user tasked with configuring the device. The responses to the questions may be associated with configuration settings and may be automatically implemented based on responses to the questions.

At 522, method 500 may determine whether any additional configuration filters remain to be applied. In various embodiments, multiple configuration filters 532 may be applied. The configuration filters 532 may substantially configure a device; however, in some circumstances additional user customization may be needed to fully configure the device.

At 524, it may be determined whether additional user customization is needed. If additional configuration is needed, inapplicable settings may be obscured at 526. As described above, the large number of settings may make the task of configuring a device challenging. By identifying settings that are inapplicable, based either on features that are disabled or settings that are incompatible with the configuration filter(s) 532, the number of settings displayed to a user may be reduced. User customization may be received at 528. In some embodiments, a configuration tool, such as configuration 204 illustrated in FIG. 2, may be used to receive user customization at 528. In various embodiments, users, manufacturers, or third parties may create filters 528 or 532.

Aspects of certain embodiments described herein may be implemented as software modules or components. As used herein, a software module or component may include any type of computer instruction or computer executable code located within a computer readable storage medium. A software module may, for instance, comprise one or more physical or logical blocks of computer instructions, which may be organized as a routine, program, object, component, data structure, and the like that performs one or more tasks or implements particular abstract data types.

In certain embodiments, a particular software module may comprise disparate instructions stored in different locations of a computer readable storage medium, which together implement the described functionality of the module. Indeed, a module may comprise a single instruction or many instructions, and may be distributed over several different code segments, among different programs, and across several computer readable storage media. Some embodiments may be practiced in a distributed computing environment where tasks are performed by a remote processing device linked through a communications network. In a distributed computing environment, software modules may be located in local and/or remote computer readable storage media. In addition, data being tied or rendered together in a database record may be resident in the same computer readable storage medium, or across several computer readable storage media, and may be linked together in fields of a record in a database across a network.

The software modules described herein tangibly embody a program, functions, and/or instructions that are executable by computer(s) to perform tasks as described herein. Suitable software, as applicable, may be readily provided by those of skill in the pertinent art(s) using the teachings presented herein and programming languages and tools, such as XML, Java, Pascal, C++, C, database languages, APIs, SDKs, assembly, firmware, microcode, and/or other languages and tools.

Figure 6:
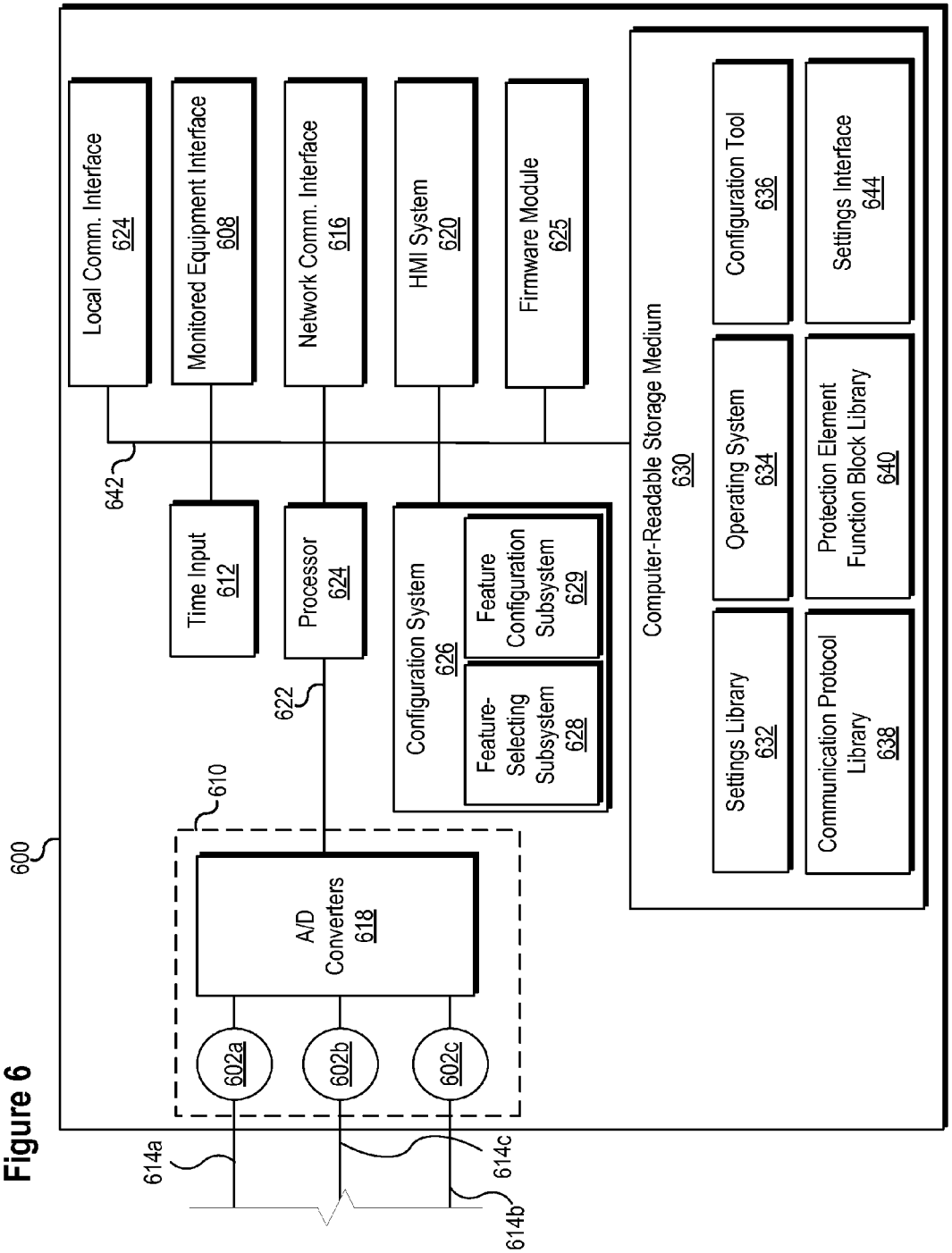
FIG. 6 illustrates a functional block diagram of a system capable of being configured, at least in part, using a device configuration filter and a feature-selecting filter consistent with embodiments of the present disclosure.

FIG. 6 illustrates a function block diagram of a configurable IED 600 consistent with embodiments of the present disclosure. IED 600 may be configured to perform a variety of tasks using a configurable combination of hardware, software, firmware, and/or any combination thereof. Although FIG. 6 illustrates an embodiment that includes hardware and software, various embodiments of the present disclosure may be implemented in an embedded system, field programmable gate array implementations, and specifically designed integrated circuit. Software functions described in connection with various software modules may be implemented in various types of hardware. Moreover, certain components or functions described herein may be associated with other devices or performed by other devices. The specifically illustrated configuration is merely representative of one embodiment consistent with the present disclosure.

IED 600 includes a network communications interface 616 configured to communicate with other IEDs and/or system devices. In certain embodiments, the network communications interface 616 may facilitate direct communication with another IED or communicate with another IED over a communications network. The network communications interface 616 may facilitate communications with multiple IEDs. IED 600 may further include a time input 612, which may be used to receive a time signal allowing IED 600 to apply a time-stamp to the acquired samples. In certain embodiments, a common time reference may be received via communications interface 616, and accordingly, a separate time input may not be required for time-stamping and/or synchronization operations. One such embodiment may employ the IEEE 1588 protocol. A monitored equipment interface 608 may be configured to receive status information from, and issue control instructions to, a piece of monitored equipment.

A local communication interface 624 may also be provided for local communication with IED 600. The local communication interface 624 may be embodied in a variety of ways, including as a serial port, a parallel port, a Universal Serial Bus (USB) port, an IEEE 1394 Port, and the like.

In certain embodiments, IED 600 may include a sensor component 610. In the illustrated embodiment, sensor component 610 is configured to gather data directly from a plurality of conductors 614a-c and may use, for example, A/D converters 618 that may sample and/or digitize filtered waveforms to form corresponding digitized current and voltage signals provided to data bus 622. Conductors 614a-c may be electrically connected to an electric power distribution system. In some embodiments transformers (not shown) may reduce the voltage or current to a level appropriate for monitoring using the IED 600. A/D converters 618 may include a single A/D converter or separate A/D converters for each incoming signal. A current signal may include separate current signals from each phase of a three-phase electric power system. A/D converters 618 may be connected to processor 624 by way of data bus 622, through which representations of electrical parameters determined by sensor elements 602a-c may be transmitted to processor 624. In various embodiments, the representations of electrical parameters may represent parameters, such as currents, voltages, frequencies, phases, and other parameters associated with an electric power distribution system. Sensor elements 602a-c may represent a variety of types of elements, such as voltage transformers, current transformers, status inputs, a breaker controller, etc.

In some embodiments, the operation of one or more of sensor elements 602a-c may be selectively enabled based on the configuration of IED 600. Further, a user may be able to enable additional sensor elements after a device is installed using the techniques described herein for upgrading devices. In some embodiments, sensor elements that are selectively enabled or disabled may comprise virtual elements running on processor 624. In some embodiments, communications interface 616 may be used to receive additional feature-selecting filters associated with an upgrade. For example, IED 600 may be initially installed and configured for an application that requires use of only one sensor component (e.g., sensor component 602a). Continuing the example, an additional sensor component may be needed, and a user may purchase an upgrade at a later time. The upgrade may occur by selectively enabling an additional sensor component (e.g., sensor component 602b). This example may be applicable where IED 600 operates in a sub-station of an electric power distribution system and the sensor components are configured to monitor a distribution bus. At a later time, a second distribution bus may be added to the substation, thus necessitating activation of an additional sensor component.

Processor 624 may be configured to process communications received via communications interface 616, time input 612, monitored equipment interface 608, and/or sensor component 610. Processor 624 may operate using any number of processing rates and architectures. Processor 624 may be configured to perform various algorithms and calculations described herein. Processor 624 may be embodied as a general purpose integrated circuit, an application specific integrated circuit, a field-programmable gate array, and/or any other suitable programmable logic device.

A configuration system 626 may be configured to receive one or more filters (e.g., one or more feature-selecting filters and/or configuration filters) and/or user customizations to configure IED 600 to perform a specific task. A feature-selecting subsystem 628 may be configured to selectively enable or disable various features that may be performed by IED 600, as appropriate to perform a particular task. A feature configuration subsystem 629 may facilitate configuration of the features enabled by feature-selecting subsystem 628.

The configuration system 626 may operate, in some embodiments, in conjunction with a firmware module 625. The firmware module 625, among other tasks, may be configured to implement one or more feature-selecting filters and/or one or more configuration filters. The firmware module 625 may provide a relatively permanent way for certain settings associated with IED 600 to be specified. Firmware module 625 may comprise a combination of hardware and computer-executable code stored in non-volatile memory, which may involve the use of specific techniques to access and/or modify. Such techniques may help to prevent user modification of firmware specified settings. In one specific embodiment, IED 600 may be configured to selectively activate one or more elements based on a setting specified in the firmware. For example, one or more of sensors 602a-c may be enabled or disabled based on a setting specified in the firmware module 625.

A Human-Machine Interface (HMI) system 620 may be configured to facilitate interaction between a user and IED 600. In some embodiments, HMI system 620 may comprise one or more of a display, keyboard, mouse, touch-screen, speaker, and the like. In some embodiments, one or more elements of HMI may be selectively enabled by a configuration of IED 600. For example, visualization features may be enabled or disabled based on a configuration setting specified by a filter.

A computer-readable storage medium 630 may be the repository of various software modules configured to perform any of the methods described herein. A data bus 642 may link monitored equipment interface 608, time input 612, communications interface 616, configuration system 626, HMI system 620, firmware module 625, and computer-readable storage medium 630 to processor 624. Various modules and/or sub-modules may be selectively enabled based on the configuration of IED 600.

A settings library 632 may include all configurable attributes of IED 600. In some embodiments, the settings library 632 may be configured to selectively make available applicable settings and/or hide inapplicable settings based on a particular application in which IED 600 is to be utilized. For example, IED 600 may be capable of being configured as either a generator protection relay or a motor protection relay, and a user may be prompted to answer a question about which of these roles IED 600 is to fill. If a user indicates that IED 600 will operate as a generator protection relay, settings relating to operation as a motor protection relay may be hidden. In another embodiment, a filter may be applied to achieve a similar result (i.e., to specify a particular configuration setting and to hide unrelated settings from a user).

An operating system 634 may be configured to manage the resources of IED 600 and provides common services for modules run by IED 600. The operating system may isolate various applications for purposes of reliability. Such isolation may permit a single application to be restarted without affecting operation of the entire system. The operating system may support a superset of functions built as function blocks that have clearly defined interfaces to reduce coupling between functions.

A configuration tool 636 may be configured to produce or receive one or more feature-selecting filters and/or configuration filters and to apply the setting included in such filters to IED 600. In some embodiments, the configuration tool 636 may also be used to specify user customizable settings associated with IED 600 that are not specified by feature-selecting filters or configuration filters. The configuration tool 636 may be configured to produce or receive one or more feature-selecting filters and/or configuration filters in a variety of formats, including but not limited to: an XML file, a plain text file, an encrypted file, or a file in any number of other suitable formats. Certain embodiments may utilize XML because the file format may allow for the file to be human-readable and machine-readable.

A communication protocol library 638 may be configured to allow IED 600 to communicate with any of a variety of external devices using a variety of data communication protocols (e.g., DNP, IEC 61850, MODBUS, IEC 60870, MB, etc.). In some embodiments, a feature-selecting filter may specify which of a plurality of a plurality of available communication protocols are enabled. Further, a user may be permitted to enable additional communication protocols by upgrading the IED 600 after installation, consistent with the techniques for upgrading devices disclosed herein.

A protection element function block library 640 may provide various features that may be implemented by IED 600. For example, the protection element function block library 640 may implement, for example, an overcurrent function, an overload function, an over-frequency function, a differential function, and the like. One or more protection element functions may be selectively enabled based on one or more configuration setting. For example, where IED 600 is configured to monitor for an overcurrent condition, the overcurrent function may be enabled from the various functions provided by the protection element function block library 640. Moreover, the protection element function blocks may be enabled and combined in various combinations to achieve a desired feature set.

A settings interface module 644 may be configured to control access to the settings library 632 and ensure uniformity in the presentation of the settings. In various embodiments, the settings library 632 may be accessed, and settings may be specified in a variety of ways. For example, settings may be specified through the local communications interface 624, through the network communications interface 616, or through the HMI system 620. Still further, the settings may be specified using the configuration tool 636.

Figure 7:
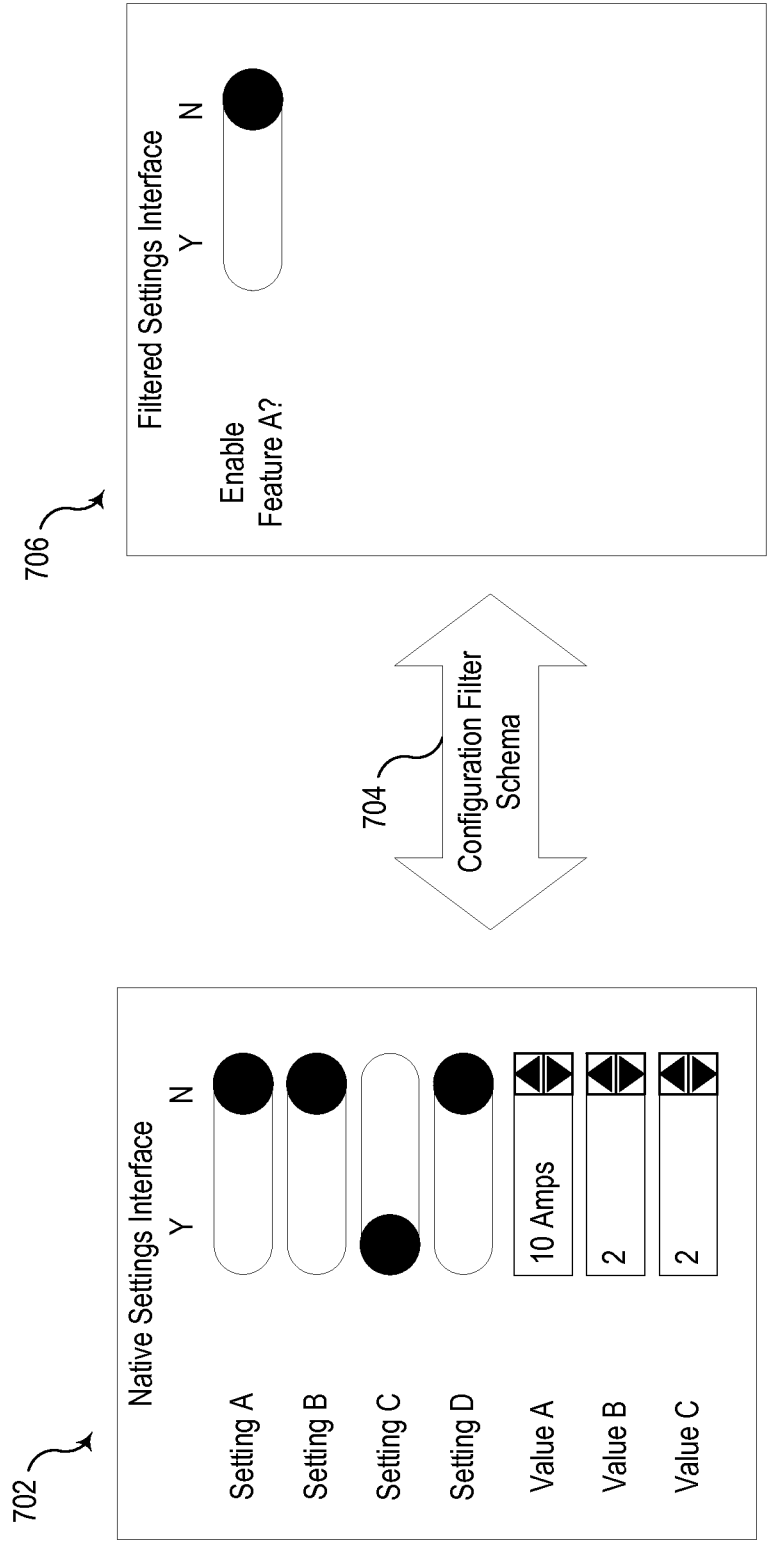
FIG. 7 illustrates an example of a native settings interface and a filtered settings interface displaying a configuration filter schema consistent with embodiments of the present disclosure.

FIG. 7 illustrates an example of a native settings interface and a filtered settings interface 706 displaying a configuration filter schema consistent with embodiments of the present disclosure. Interface 702 illustrates a native settings interface reflecting a native plurality settings on an IED. A configuration filter schema 704 may present a representation of the native settings in a filtered settings interface 706. As illustrated, the plurality of native settings may be reduced to a single activation selector that enables or disables the feature.

In some embodiments, the configuration filter schema may associate a plurality of settings (e.g., settings A-D and values A-C) with a name (e.g., feature A) that is more recognizable or descriptive than the native settings. The plurality of native settings may be difficult to recognize as being associated with a specific feature; however, where a schema is employed to associate the settings a user may be easier to recognize as being associated with a specific feature.

The configuration filter schema 704 may be configured to selectively hide one or more native IED settings. In some embodiments, settings may be hidden to help to prevent changes to the setting by a user. In other embodiments, settings may be set and hidden by a configuration filter.

In one embodiment, a configuration tool may be configured to extract a plurality of settings and a configuration filter schema associated with a device. The combination of the extracted settings and the configuration filter may be used to generate the filtered settings interface 706

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A configurable intelligent electronic device having a plurality of features, comprising:
   a plurality of functional modules configured to implement a plurality of features and configured to be selectively enabled and disabled;

a protection element function library configured to enable the configurable IED to implement at least one protection element function in an electric power distribution system;

a feature-selecting subsystem configured to:
receive a feature-selecting filter;
selectively enable a subset of the plurality of functional modules to implement the at least one protection element function based on the feature-selecting filter;

a settings library comprising a plurality of feature configuration settings associated with the plurality of features;

a feature configuration subsystem configured to:
receive a configuration filter; and
specify a first plurality of feature configuration settings in the settings library based on the configuration filter; and a configuration tool configured to receive user input to specify a second plurality of configuration settings.

2. The configurable IED of claim 1, wherein the protection element function comprises one of an overcurrent function, an overload function, an over-frequency function, and a differential function.

3. The configurable IED of claim 1, wherein at least one of the feature-selecting filter and the configuration filter comprises an XML file comprising a human-readable portion.

4. The configurable IED of claim 1, wherein the configuration tool is further configured to selectively obscure at least one setting in the settings library based on one of the feature-selecting filter and the at least one configuration filter.

5. The configurable IED of claim 1, wherein the configuration tool is further configured to aggregate a subset of the plurality of feature configuration settings into a schema and to present an activation selector to a user to enable the schema.

6. The configurable IED of claim 1, further comprising a plurality of communication interfaces configured to access the settings library.

7. The configurable IED of claim 6, wherein a settings interface configured to present a representation of a subset of the plurality of feature configuration settings according to a schema represented in the configuration filter on each of the plurality of communication interfaces.

8. The configurable IED of claim 6, wherein the plurality of communication interfaces comprises at least two of a network interface, a local interface, and a human-machine interface.

9. The configurable IED of claim 7, the configuration tool is further configured to extract at least one of the plurality of feature configuration settings and to present the extracted feature configuration settings in the schema.

10. The configurable IED of claim 1, comprising:
a firmware module;
wherein applying the feature-selecting filter comprises modifying a setting in the firmware module of the configurable relay.

11. The system of claim 1, wherein the subset of the plurality of functional modules comprises fewer than all of the plurality of the functional modules.

12. The system of claim 1, wherein the feature-selecting filter is further configured to disable a second subset of the plurality of the functional modules.

13. A method of configuring an intelligent electronic device, the method comprising:

providing a configurable intelligent electronic device capable of performing a plurality of features;
receiving a first feature-selecting filter;
applying the first feature-selecting filter to selectively enable a first subset of the plurality of features, the first subset of features having a plurality of feature configuration settings;
receiving a first configuration filter; and
applying the first configuration filter to specify at least a first subset of the plurality of feature configuration settings.

14. The method of claim 13, wherein applying the first feature-selecting filter comprises modifying a setting in a firmware module of the configurable relay.

15. The method of claim 13, further comprising:
receiving user input to specify a second subset of the plurality of feature configuration settings.

16. The method of claim 15, further comprising selectively obscuring at least one setting based on one of the feature-selecting filter and the configuration filter.

17. The method of claim 13, wherein at least one of the feature-selecting filter and the configuration filter comprises an XML file comprising a human-readable portion.

18. The method of claim 13, wherein receiving the first feature-selecting filter comprises transmission via a secured communication channel.

19. The method of claim 18, wherein the secured communications channel comprises one of: a communication channel between the configurable IED and a license server; a USB dongle, and an encrypted file.

20. The method of claim 13, further comprising reconfiguring the configurable IED from a first product based on the first feature-selecting filter to a second product based on a second feature-selecting filter.

21. The method of claim 13, further comprising upgrading the configurable IED by receiving a second feature-selecting filter configured to enable a second subset of the plurality of features, the second subset comprises additional features in comparison of the first subset.

22. A configurable intelligent electronic device (IED) having a plurality of features, comprising:
a plurality of functional modules configured to implement a plurality of features and configured to be selectively enabled and disabled;
a feature-selecting subsystem configured to:
receive a first feature-selecting filter;
apply the first feature-selecting filter to selectively enable a subset of the plurality of functional modules based on the feature-selecting filter;
a settings library comprising a plurality of feature configuration settings associated with the subset of the plurality of features;
a feature configuration subsystem configured to:
receive a configuration filter; and
specify a first subset of the plurality of feature configuration settings in the settings library based on the configuration filter.

23. The configurable IED of claim 22, comprising:
a firmware module;
wherein applying the first feature-selecting filter comprises modifying a setting in the firmware module of the configurable relay.

24. The configurable IED of claim 22, comprising:
a configuration tool configured to receive user input to specify a second subset of the plurality of feature configuration settings.

25. The configurable IED of claim 24, wherein the configuration tool is further configured to aggregate a subset of the plurality of feature configuration settings into a schema and to present an activation selector to a user to enable the schema.

26. The configurable IED of claim 22, wherein receiving the first feature-selecting filter comprises transmission via a secured communication channel.

27. The configurable IED of claim 22, wherein the secured communications channel comprises one of: a communication channel between the configurable IED and a license server; a USB dongle, and an encrypted file.

28. The configurable IED of claim 22, further comprising reconfiguring the configurable IED from a first product based on the first feature-selecting filter to a second product based on a second feature-selecting filter.

29. The configurable IED of claim 22, further comprising upgrading the configurable IED by receiving a second feature-selecting filter configured to enable a second subset of the plurality of features, the second subset comprises additional features in comparison of the first subset.

30. The configurable IED of claim 22, further comprising:
 a communication protocol library configured to selectively enable the configurable IED to communicate using at least one of a plurality of communication protocols; and wherein the feature-selecting filter is configured to enable communication according to one of the plurality of communication protocols.

31. The configurable IED of claim 22, further comprising:
 a protection element function library configured to selectively enable the configurable IED to implement a protection element function;

wherein the feature-selecting filter is configured to enable the configurable IED to implement the protection element function.

32. The configurable IED of claim 22, wherein the feature-selecting filter comprises one of a market position filter, a custom product filter, a localization filter, a naming convention filter, a preconfigured template filter, and a user defined filter.

33. The configurable IED of claim 22, further comprising a plurality of communication interfaces configured to access the settings library.

34. The configurable IED of claim 33, wherein a settings interface configured to present a representation of a subset according to a schema represented in the configuration filter on each of the plurality of communication interfaces.

* * * * *